: 3,036,142
Patented May 22, 1962

3,036,142
PRIMARY BATTERY
Leo Goldenberg, 900 Malta Lane, Silver Spring, Md., and Morris Fidelman, Adelphi, Md. (1217 De Vere Drive, Silver Spring, Md.)
Filed July 18, 1958, Ser. No. 749,408
4 Claims. (Cl. 136—100)

This invention relates to a novel primary battery based upon magnesium. More particularly this invention relates to and constitutes an improvement over the magnesium galvanic cell disclosed and claimed in copending application, S.N. 749,363, filed simultaneously herewith.

As pointed out in the aforementioned copending application, the reaction of magnesium with water to produce magnesium hydroxide, hydrogen and electricity can be effected in a manner which produces substantial amounts of current at usable voltages by employment of chemically inert high surface area cathodes. The foregoing copending application is particularly directed to improved cathode materials for the individual cells. The instant invention relates to a battery structure comprising a multiplicity of individual galvanic cells assembled in a particularly advantageous manner.

It has been found that an assemblage of a multiplicity of magnesium cells into a battery requires certain critical inter-relationships in order to maintain a high relatively constant voltage and current output throughout the life of the battery.

The magnesium cell inherently requires a continuing consumption of metallic magnesium and water, with a concomitant continuing production of hydrogen and magnesium hydroxide. According to the practice of this invention, the hydrogen is permitted to evolve freely through the electrolyte and pass out the top surface of the electrolyte. Similarly the magnesium hydroxide floc should be removed promptly from the cell. Also, excess water must be provided in order to maintain the cell full of electrolyte despite continuing consumption of water by the reaction.

According to the practice of the instant invention, the evolution of hydrogen and the removal of magnesium hydroxide is effected by providing a top and bottom free space for electrolyte above and below each cell, and a free unburdened passage for electrolyte to circulate between the electrodes forming each cell. Thus the electrolyte can flow up or down, but lateral passage is hindered in the manner hereinafter set forth. The problem of water removal via chemical reaction and evaporation is also solved by providing space for excess electrolyte above, below and alongside the electrolytic cells. These basic battery features are integrated with the individual characteristic of the magnesium galvanic cell in a manner which will be better understood by reference to the attached drawing and the following description.

Referring now to the drawing wherein a two-cell assembly forming part of a battery is diagrammatically illustrated:

Figure 1:
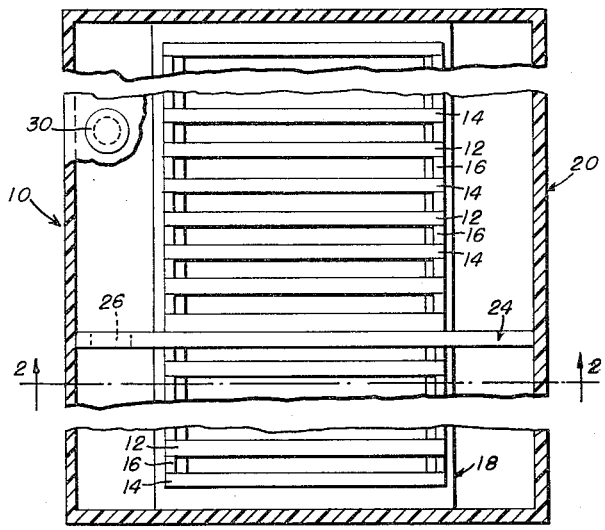
FIGURE 1 is a plan view partially in section of the battery.
Figure 2:
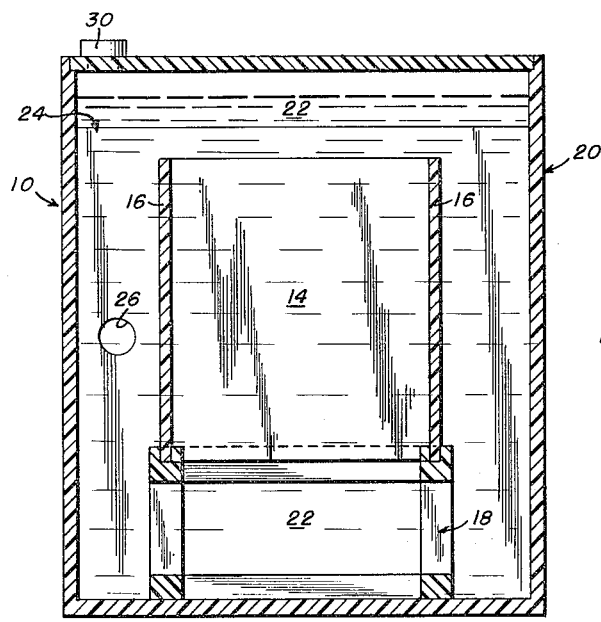
FIGURE 2 is an elevation taken along line 2—2 on FIGURE 1.
Figure 3:
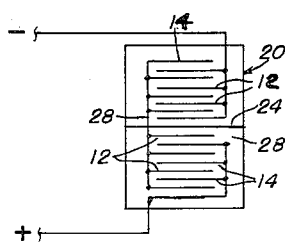

FIGURE 3 diagrammatically shows the electrical connections in the battery.

It can be seen that each galvanic cell is made up of a magnesium or magnesium alloy anode 12 spaced apart from an inert cathode 14 by a pair of vertical spacer elements 16 disposed adjacent the vertical side edges of the pair of electrodes. Spacer elements 16 extend substantially the entire height of the electrodes. There are no horizontal barriers (such as spacers) against vertical movement of the electrolyte inside the volume bounded by anode 12, cathode 14 and spacers 16. Desirably the assembled battery is mounted atop an open framework 18 which in turn rests on the bottom of battery casing 20. In this fashion the assembled cells are spaced apart from the bottom of the casing 20 to provide electrolyte free space beneath the cells. Similarly the casing is made oversized relative to the cell width to provide additional free space along the side edges as shown in the drawing. In passing, it may be mentioned that open framework or rack 18 can be omitted and instead the separators or spacers 16 made sufficiently strong to serve as battery supports, and long enough to serve as stilts. In this alternative construction (not shown) the entire battery could either be suspended from the top of the casing by separators 16 or stand on the separators. In either event electrolyte free space 22 is provided alongside, above and beneath the battery cells. A lateral spacer 24 may be provided as a separator between each set of parallel-connected cells in order that a multiplicity of such sets of cell assemblies may be connected in series to provide a voltage higher than is available from one cell or one set of parallel-connected cells. Lateral spacer 24 is shown to extend clear across casing 10 and may completely subdivide the casing into a multiplicity of cell compartments. It is, however, preferable to provide at least one or more openings 26 in lateral spacer 24 to allow free passage of electrolyte throughout the entire casing. Then should some malfunction cause one cell to consume more electrolyte than another, some of the excess electrolyte can flow into the malfunctioning cell from an adjacent cell. Conventional electrical connections 28 may be provided between each of the cells in series. A vent 30 is provided for liberation of hydrogen from the battery casing, and desirably may be capped with a conventional porous ceramic spark arrester whose purpose is to permit passage of hydrogen while preventing explosion due to sparks, etc.

The advantages of the structure shown in the drawing are based upon the particular characteristics of a battery formed from magnesium galvanic cells. As has been pointed out in the aforementioned companion application, a cell spacing of from 0.1 to 20 mm. between the anode and cathode of a cell is critical. As a result even an electrode spacing of 20 mm. provides but a relatively small volume of electrolyte within the cell itself. In fact the electrolyte volume is insufficient for more than a brief period of operation. This can be demonstrated from a representative set of cell dimensions, namely the maximum spacing of 20 mm. for a cell having a square electrode 200 x 200 mm. The enclosed volume is 200 x 200 x 20 or 800 cubic centimeters, roughly 800 grams of water. If this were the entire water supply, consumption of 1 mm. from the magnesium anode would also consume roughly 100 cc. of the available liquid, thereby exposing the upper portion of the electrodes and cutting down on the usable electrode area substantially. This would upset the relationship of current density to voltage. To a lesser degree the electrolyte balance would also be upset by the consequent increased concentration of the salts present. By and large at these maximum spacing figures of 20 mm. and a reasonable minimum consumption of metal magnesium per cell of 1 mm., the total liquid loss approximates 15% of the liquid available within the cell. Accordingly it is necessary for the proper practice of the instant invention to immerse the cells inside a casing large enough to provide a free spacing exceeding 15% of the volume of electrolyte originally situated between the electrodes in order to provide make-up for electrolyte consumed by operation of the battery. Peculiarly enough there is no upper limit for the amount of free space because it is within express contemplation of the instant invention to construct an open battery for direct immersion in sea water. Such a battery can serve as an emergency power source for life rafts or boats. In such instances the free space for excess electrolyte would consist of the entire ocean, and be virtually infinite. For many uses, notably where a container is present, the 15% figure need not be materially exceeded because periodic addition of water to the battery can be made without imposing an undue hardship upon the user. In passing it may be noted that production of the magnesium hydroxide by the cell is the reason for providing some of the excess electrolyte space below the electrolytic cells. Were the magnesium hydroxide allowed to remain in the electrolyte within the cell there would be a tendency for it to pack between the plates at the bottom of the cell. This solid product would displace electrolytic upward and would eventually pack sufficiently to cause the lowermost portion of the electrodes to be unavailable for electrolytic action. According to the practice of the instant invention a substantial portion of the free space is provided below the galvanic cells.

While the foregoing explanation has been given in terms of maximum electrode spacing, it should be borne in mind that a much lower spacing than 20 mm. would ordinarily be provided. As a general rule of thumb the electrode spacing provided should about equal the thickness of magnesium anode to be consumed. Thus to give a specific example of preferred practice: A magnesium sheet 1/8" thick is employed and consumed from both surfaces, in a cell with an electrode spacing of about 1/16". With these dimensions, consumption of 1 mm. (approximately .04") of magnesium would require more water for the reaction than the total electrolyte initially contained between the two electrodes. Thus the need for excess electrolyte is readily apparent.

Moreover the reaction of magnesium with water to produce current is accompanied also by evolution of heat, and electrolyte losses attributable to vaporization must, therefore, also be overcome. In fact, overheating can become somewhat of a problem. A more important factor, however, is the desirability of attaining a high degree of electrolyte circulation and turbulence between the electrodes. Aside from the prevention of overheating, there are many reasons for the desirability of electrolyte circulation. Firstly, and foremost, tests have shown that a high degree of turbulence improves the current-voltage characteristics of the magnesium galvanic cell. Another important reason is that a high level of electrolyte movement can be used to remove the magnesium hydroxide product from the cell. Finally the rapid circulation does prevent local overheating and minimizes loss of electrolyte through evaporation. All of these desirable objects are attained by positioning spacer elements adjacent the side edges of the electrodes. These spacer elements should, of course, be longitudinally elongated so as to provide a barrier against lateral flow of electrolyte into or out of the side of the cell at mid regions of the cell. The spacer elements need not extend completely top to bottom of the electrodes, but by and large they should extend more than half the vertical height of the electrodes.

With this above-described construction a plurality of galvanic cells assembled into a battery according to the practice of the instant invention can be directly immersed in sea water. The hydrogen evolving from the reaction creates a gas lift which forces electrolyte from beneath the cell bottom up through the cell itself, then over the top of the cell (or at least over the top edge of the elongated spacer elements) and finally laterally away from the cell. This flow of electrolyte carries with it the flocculent magnesium hydroxide produced by the battery action. Moreover, fresh electrolyte is always flowing up through the cell, thereby avoiding overheating. At the same time a desired turbulence is maintained in each galvanic cell.

The chimney effect provided by the side spacers and the relatively narrow electrode spacing is particularly important for conditions of low power drain because even the smaller amount of hydrogen thus produced creates an electrolytic circulation by means of which the magnesium hydroxide product is carried away from the anode surface and out over the top or side edges of the galvanic cell. The smaller amount of hydrogen produced at the anode at the lower current densities would otherwise be of itself inadequate to provide for scouring the magnesium hydroxide off the anode surface.

A significant feature of the instant invention is that the battery should be completely immersed in electrolyte in order to provide maximum utilization of the available magnesium. Obviously any part of the magnesium anodes extending above the surface of the electrolyte is not available for consumption in the battery. Thus even though the side spacers need not extend to the top edge of the electrodes, there is little point in wasting potential power by permitting the electrode to emerge from the electrolyte. The excess electrolyte standing above the uppermost level of the electrolytic cells serves as the principal source of electrolyte. The displacement of the electrolyte in the bottom free space by precipitated magnesium hydroxide serves to provide a secondary supply of electrolyte. The actual amount of excess electrolyte to be provided inside the battery container depends upon the frequency with which water can be added during the life of the battery.

The following is a specific example of a battery constructed according to the practice of the instant invention.

Forty 6" x 6" squares of pure magnesium 1/8" thick (about 10 pounds of Mg) were used for anodes, and fifty 6" x 6" mild steel sheets about 10 mils thick, each electroplated to a matte finish with about one mil of nickel (at 25 amps. per square foot using the "Watts" electroplating bath) were employed as cathodes to make up a ten cell battery. For each cell, four magnesium plates and five of the cathode plates were placed face to face separated only by polystyrene side spacers 1/16" thick, 4" long and 1/4" wide, the cells being separated by a thin polystyrene sheet. The 10 cells were electrically hooked up in series to give a ten-cell battery 6" x 6" by about 12". A container having internal dimensions of 7" x 10" x 12" had placed therein an open box-work platform which stood three inches above the bottom. The battery rested on the platform. The top edges of the cells were one inch below the top of the container. The electrolyte employed in this instance was a saturated solution of sodium chloride in tap water. The battery developed 6 volts at 40 amperes (240 watts) drain. The maximum power drain of this battery was 100 amperes at 3.5 volts (350 watts).

What is claimed is:

1. A magnesium based primary battery comprising a casing enclosing a plurality of electrolytic cells, in each cell the electrodes therein being spaced apart from the side walls, the bottom wall and the top edge of said casing sufficient to provide an electrolyte free space exceeding about 15% of the volume of electrolyte originally situated between the electrodes, the normal liquid level of electrolyte in each cell being above the top edge of the electrodes, each cell having a magnesium anode electrode spaced apart from an inert cathode electrode a distance of 0.1 to 20 mm. by elongated spacer elements positioned adjacent the side edges of the electrodes, each cell being open top to bottom for cyclic continuous passage of electrolyte from the free space beneath the electrodes up through the electrodes to the free space above the electrodes and back down between the electrodes and the casing side walls.

2. A magnesium based primary battery made from a plurality of cells, each cell comprising: a magnesium anode, an inert cathode positioned face to face and separated by a pair of elongated spacer elements one adjacent each side edge of these electrodes and serving to separate anode from cathode a distance ranging from 0.1 to 20 mm., each cell being otherwise open top and bottom for entry of electrolyte up through the bottom and release of hydrogen from the top, said battery being adapted for total immersion in a volume of electrolyte exceeding the volume of electrolyte originally situated between the electrodes by at least 15% with the normal liquid level of the electrolyte being above the top edge of the electrodes and the top, bottom, and side electrolyte bounding walls being spaced apart from the electrodes, whereby electrolyte can cyclically circulate from beneath the cells up through the cells, down outside the cells, and back beneath the cells.

3. A magnesium battery as in claim 1 wherein the spacer elements extend at least half the vertical height of the anode.

4. A magnesium battery as in claim 2 wherein the spacer elements extend at least half the vertical height of the anode.

References Cited in the file of this patent

UNITED STATES PATENTS

| | | |
|---|---|---|
| 704,303 | Edison | July 8, 1902 |
| 769,975 | Wood | Sept. 13, 1904 |
| 2,474,716 | Beechlyn | June 28, 1949 |
| 2,590,584 | Taylor | Mar. 25, 1952 |
| 2,684,990 | Rappaport | July 27, 1954 |
| 2,706,213 | Lucas | Apr. 12, 1955 |
| 2,714,624 | Costa et al. | Aug. 2, 1955 |